United States Patent [19]
Karlsson et al.

[11] Patent Number: 6,157,842
[45] Date of Patent: Dec. 5, 2000

[54] SYSTEM AND METHOD FOR POSITIONING A MOBILE STATION IN A CDMA CELLULAR SYSTEM

[75] Inventors: Jonas Karlsson, Kista; Fredrik Ovesjö, Solna, both of Sweden

[73] Assignee: TelefonakTiebolaget LM Ericsson, Stockholm, Sweden

[21] Appl. No.: 08/951,345

[22] Filed: Oct. 16, 1997

[51] Int. Cl.⁷ .................................................. H04Q 7/20
[52] U.S. Cl. ........................................ 455/456; 455/524
[58] Field of Search ................................. 455/456, 457, 455/59, 522, 524, 502; 342/450, 463; 370/342

[56] References Cited

U.S. PATENT DOCUMENTS

| | | | |
|---|---|---|---|
| 5,341,397 | 8/1994 | Gudmundson | 375/1 |
| 5,508,708 | 4/1996 | Ghosh et al. | 342/457 |
| 5,600,706 | 2/1997 | Dunn et al. | 379/59 |
| 5,970,413 | 10/1999 | Gilhousen | 455/456 |

FOREIGN PATENT DOCUMENTS

| | | |
|---|---|---|
| WO97/08911 | 3/1997 | WIPO . |
| WO97/47148 | 12/1997 | WIPO . |

*Primary Examiner*—Nguyen Vo
*Attorney, Agent, or Firm*—Jenkens & Gilchrist, P.C.

[57] ABSTRACT

A system and method for improving the accuracy of a location estimation measurement within a telecommunication system is disclosed. During a cessation of transmissions by a local base transceiver system in communication with the mobile station, the mobile station communicates with other, more remote base transceiver systems and trilateration and other distance measuring techniques are employed to calculate the position of the mobile station in relation to those remote base transceiver systems. In another embodiment of the present invention, the local base transceiver system is also used to calculate the position. In still another embodiment, during a cessation of transmissions by the mobile stations in communication with a local base transceiver system, the local base transceiver system is better able to use remote mobile stations for trilateration.

62 Claims, 2 Drawing Sheets

SYSTEM AND METHOD FOR POSITIONING A MOBILE STATION IN A CDMA CELLULAR SYSTEM

BACKGROUND OF THE PRESENT INVENTION

1. Field of the Invention

The present invention relates, in general, to wireless communications systems, particularly, to a system and method for improved mobile station location, and, more particularly, to a system and method for facilitating the positioning of a mobile station in a code division multiple access cellular system.

2. Background and Objects of the Present Invention

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

Pursuant to a recent Federal Communications Commission (FCC) Ruling and Order, cellular phone service providers within the United States must provide by October 2001 the capability to locate the position of a cellular or mobile phone making an emergency (911) call within the provider's system to within 125 meters with about 67% probability, i.e., within one standard statistical deviation. A variety of techniques are currently under study to implement this technology into existing and proposed systems.

For example, in Time Division Multiple Access (TDMA) telecommunications systems a mobile terminal or station (MS) is in communication with a given base transceiver station or system (BTS) during only one of typically eight sequential and repeating timeslots. Other MSs communicate separately with the BTS during the other timeslots. The MS may therefore utilize one or more of the other, unused (by that mobile station) timeslots for other uses, such as positioning. In this manner, the timeslot and frame structure of TDMA protocols may be exploited.

With reference to FIG. 1, there is shown a portion of a cellular telecommunications system having a mobile station 10 in communication with a first BTS 12 and, of course, in communication with another user linked thereto, such as via a Public Switched Telephone Network (PSTN) 14. Additional mobile stations 10A, 10B and 10C, also in communication with the BTS 12, are also shown.

As is understood in the telecommunications art, the MS 10 monitors the strength of its signal link with the BTS 12 and maintains that link until a better signal link occurs, e.g., the MS 10 may move away from the BTS 12 toward a neighboring BTS, such as one of BTSs 12A–12D, and hand over control to that BTS. To accomplish such handovers, the MS 10 also monitors the signal strengths of the neighboring BTSs 12A–12D (and any other such systems within range). TDMA systems utilize frequency reuse algorithms to distribute sets of discrete frequencies in a non-repeating manner so that contiguous communications areas or cells, covered by respective BTSs, do not share frequencies. In this way, the MS 10 in TDMA systems may readily measure the received power from a given BTS on unused timeslots and using frequencies different from that of a neighboring BTS.

Code Division Multiple Access (CDMA) systems, on the other hand, operate very differently from the aforementioned TDMA systems and provide fewer and less advantageous opportunities to exploit the inherent properties of the standard. CDMA protocols do not achieve their multiple access property by a division of the transmissions of different users in either time or frequency, as in TDMA and in Frequency Division Multiple Access systems, but instead make a division by assigning each user a different code, which. is used to transform a user's signal into a wideband or spread1 spectrum signal which is joined with other such signals from other users. As is understood in the art, a receiver receiving multiple wideband signals uses the code assigned to a particular user to transform the wideband signal received from that user within the combined signal back to the original signal. Additionally, and with reference again to FIG. 1, each BTS in a CDMA system uses the same frequencies, thereby further limiting the exploitation of distinguishing features.

Accordingly, under CDMA protocols, particularly the current IS-95 standard, it is a non-trivial task to modify the standard to accomplish the FCC mandate. One particular problem encountered is estimating an MS' position when the MS is relatively close to a given BTS, e.g., MS 10 and BTS 12 in FIG. 1. In operation, the determination of an MS' position entails using either several base stations, e.g., BTSs 12 and 12A–12D, measuring the time delay of at least three of their signals to the MS 10, or the MS 10 itself measures the time delays to several of the BTSs. As shown in FIG. 1, if the MS 10 is close to BTS 12 and the neighboring BTSs 12A–12D are doing the positioning measurements, e.g., through signal time delay, then the signal from the MS 10 may be too weak for the much more distant base stations, i.e., BTS 12C, to measure. Conversely, if the MS 10 in this situation were doing the measurements, then the strong transmission power from the adjacent BTS 12 may drown out the signals, on the same frequencies, from all of the more distant BTSs 12A–12D.

There is, therefore, a need to provide an improved system and method for determining the geographical position of a mobile station within a CDMA environment.

It is, accordingly, a first object of the present invention to provide such an improved system and method for mobile station positioning.

It is also an object of the invention that the system and method of the present invention substantially adhere to the CDMA protocols, for example, the IS-95 standard.

It is a further object of the invention that the system and method set forth herein allow telecommunications systems operating in CDMA to meet the upcoming FCC requirements for mobile station positioning within the United States and any subsequent countries requiring such positional accuracy.

It is a still further object of the present invention that the system and method facilitate mobile station positioning in a variety of contexts, including situations where the mobile station is adjacent one base transceiver system and distant from contiguous or neighboring base transceiver systems.

SUMMARY OF THE INVENTION

The present invention is directed to a system and method for improving the accuracy of a location estimation measurement of a mobile station within a telecommunications system. During a cessation of transmissions by a local base transceiver system in communication with the mobile station, the mobile station communicates with other, more remote base transceiver systems and trilateration and other distance measuring techniques are employed to calculate the position of the mobile station in relation to those remote base transceiver systems. In another embodiment of the present invention, the local base transceiver system is also used to calculate the position. In still another embodiment, during a cessation of transmissions by the mobile stations in communication with a local base transceiver system, the local base transceiver system is better able to use remote mobile stations for trilateration.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The EIA/TIA/IS-95 "Mobile Station-Base Station Compatibility Standard for Dual-Mode Wideband Spread Spectrum Cellular System" defines a digital cellular radio common air interface using Code Division Multiple Access (CDMA) technology. Pursuant to CDMA standards, both the base transceiver station, e.g., BTSs 12 and 12A–12D in FIG. 1, and the mobile station 10 transmit a Pseudo-random Noise (PN) spreading sequence, resulting in a 1.23 MHZ transmission bandwidth.

The forward or downlink transmission from each BTS to a mobile station or terminal has four types of channels: pilot, paging, synchronization (sync) and traffic. As is understood in the art, these channels are all transmitted on the same carrier frequency, using the same PN spreading code. The channels, however, are distinguished through binary orthogonal codes such as based on Walsh functions. Each BTS transmits one pilot channel, one sync channel and multiple paging and traffic channels. The downlink signals from different BTSs are distinguished through PN spreading code phase offsets, i.e., every BTS uses the same PN spreading code, but the code is transmitted using different time offsets (or code phases) from a master code.

On the reverse or uplink CDMA transmission, e.g., from the mobile station (MS) 10 to the BTS 12, each mobile transmission is differentiated within the BTS 12 by the use of a long PN spreading code, where each MS transmits at a code phase time offset determined by a user address. It should be understood, however, that prior to being assigned such an uplink, the MS 10 must contact the BTS 12 using a reverse or uplink access channel.

With reference again to FIG. 1, position calculation of a mobile station such as MS 10 within a geographic area may be performed through the use of time difference of arrival trilateration techniques, such as hyperbolic trilateration, time of arrival techniques, such as ranging trilateration, and angle of arrival techniques. In a preferred embodiment of the present invention, using time differences of arrival (TDOA) techniques, the intersection of three or more hyperbolic curves of constant time delay of pulse arrival between three BTSs and an MS (in certain circumstances two BTSs may suffice to pinpoint the geographical location of the MS).

Figure 1:
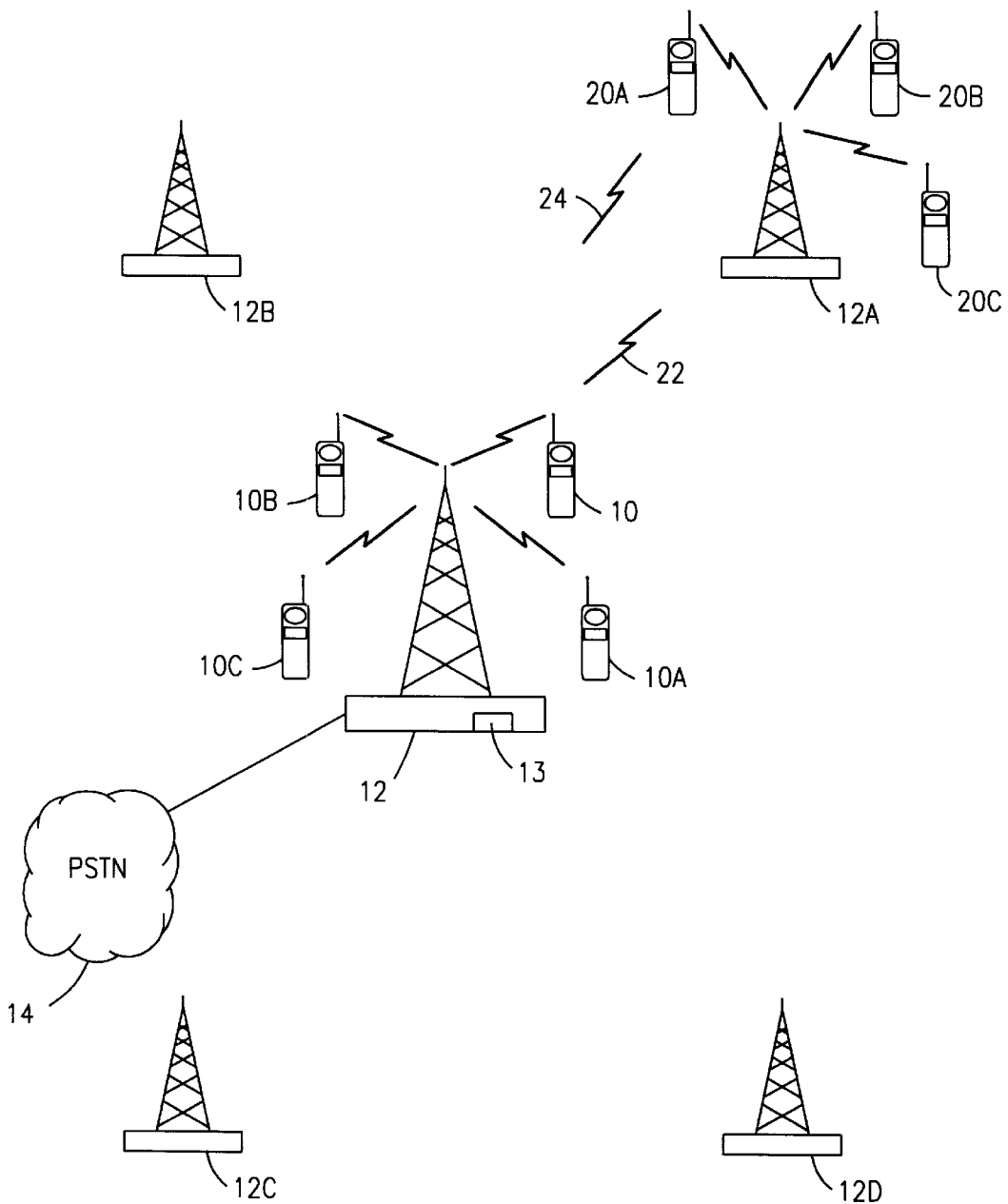
FIG. 1 is a block diagram illustrating base transceiver systems and mobile stations, components of a telecommunications system employing the principles of the present invention.
Figure 2:
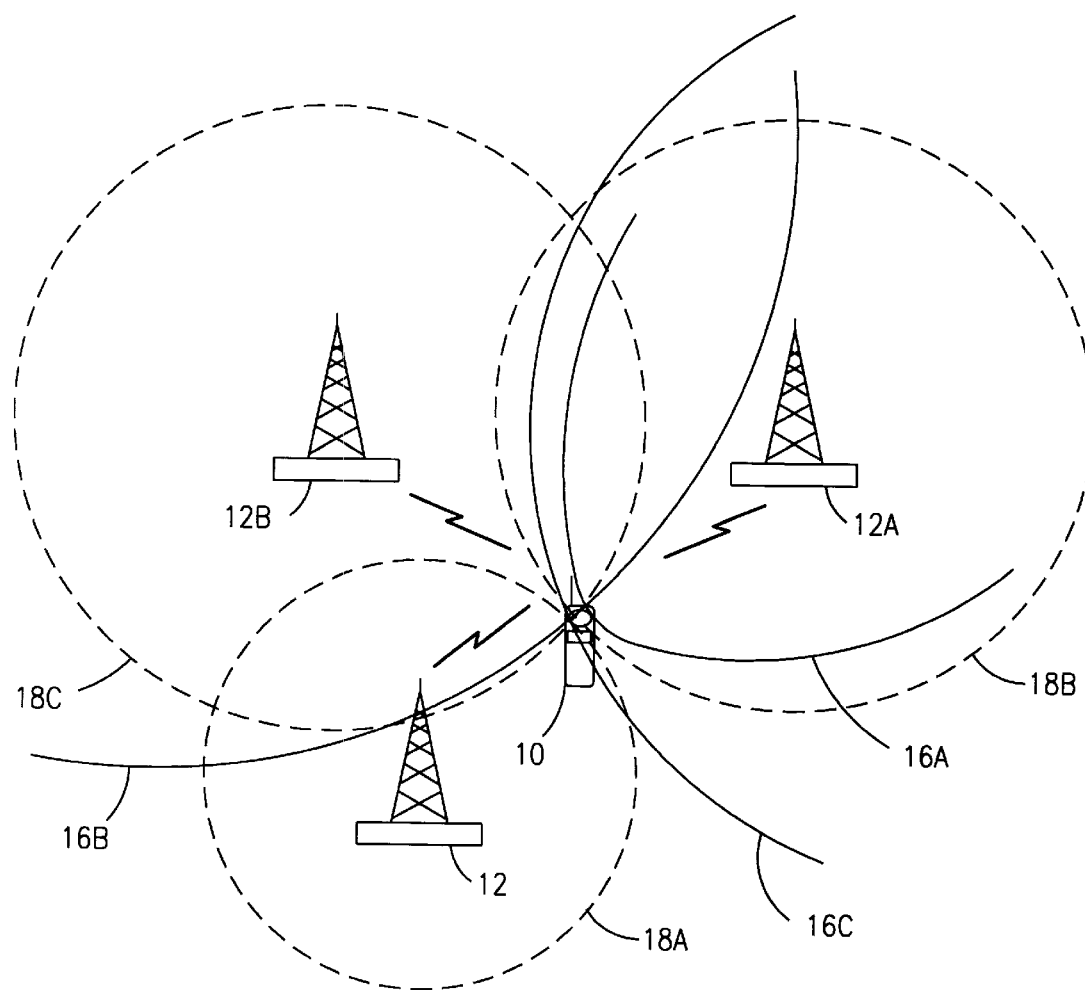
FIG. 2 is a representative diagram of various time delay techniques used in position location estimation of mobile stations, such as utilized in implementing the present invention with the configuration shown in FIG. 1.

With reference now to FIG. 2, there is shown a portion of FIG. 1 in which the MS 10 is in communication with the BTS 12. Neighboring BTSs 12A and 12B are also shown. In measuring the aforementioned TDOA between two BTSs, e.g., of the signal from the MS 10, a hyperbola is formed, as is understood in the mathematical arts. For example, hyperbola 16A represents the line of potential locations of the MS 10 with reference to both BTSs 12 and 12A so that the difference in distance (time) between the two BTSs at each point along the hyperbola 16A is a constant. Similarly, hyperbola 16B is formed between BTSs 12 and 12B, and hyperbola 16C is formed between BTSs 12A and 12B.

As shown in FIG. 2, in the idealized absence of measurement error all three hyperbolae, i.e., hyperbolae 16A, 16B and 16C, intersect at the location of the MS 10. It should be understood, however, that in the real-world presence of measurement error, there will be some error in the determination of the intersection point. Inclusion of additional hyperbolae increase the accuracy.

With further reference to FIG. 2, dashed circles 18A, 18B and 18C represent time of arrival (TOA) distances from the respective BTSs 12, 12A and 12B, each representing the absolute propagation time between the respective BTSs and the MS 10. As with the aforementioned hyperbolae, the three circles also intersect at the locus of the MS 10, illustrating another mobile station location estimation technique.

It should, therefore, be understood that in this trilateration manner, i.e., either TDOA, TOA or other, the position of the MS 10 may be ascertained with sufficient accuracy to meet the FCC mandate.

As discussed, however, although TDMA systems and protocols are amenable to adjustments to accommodate the above location estimation techniques, CDMA systems and protocols are difficult to adapt to meet this upcoming requirement. The present invention, set forth in detail below, nonetheless attempts to provide a solution to the aforementioned problems facing location estimation techniques in CDMA systems.

With reference again to FIG. 1, a first embodiment of the present invention will be described. As discussed, one problem in location estimation in CDMA systems occurs when the MS 10 approaches a given BTS, e.g., BTS 12, too closely. Since a position location technique or algorithm, e.g., resident within a memory 13 in the BTS 12, relies upon the receipt of timing information from a minimum of three BTSs (in some instances two may suffice), when the MS 10 gets sufficiently close to BTS 12, it is by necessity furthest form the other neighboring BTSs. As a result, the signal to interference (S/I) ratios of signal links between the MS 10 and distant range BTSs, e.g., BTSs 12A and 12B, become degraded. In other words, as the MS 10 closely approaches BTS 12, the signals from that BTS saturate the MS 10 receiver, preventing reception of signals from the BTSs 12A and 12B (and others).

One solution to this saturation problem is to turn off the BTS 12 for a short period of tine, on the order of milliseconds or fractions thereof, introducing an idle period in the downlink during which the MS 10 can receive signals, such as a pilot signal on the pilot channel, from the more distant BTSs 12A and 12B and any other nearby BTSs. In this way, the advantages of the silent periods in TDMA systems may be incorporated in this different signal environment.

It should, of course, be understood that such cessations or shutdowns should be minimized to avoid frequent disruptions to the other mobile stations, i.e., MSs 10A–10C, also in communication with the BTS 12. As is understood in the art, the synchronization signal incorporates numerous information about the respective BTS, including a BTS identifier for that BTS, time reference information used in the aforementioned time delay techniques, and other information. The pilot channel, used for homing, usually consists of a sequence of zeros.

It should be understood that during the aforementioned idle period inserted into the CDMA transmission stream, the TDOA, TOA or other distance estimation measurements may be calculated and combined in the aforementioned manner to pinpoint the geographical location of the MS 10 to the desired FCC degree of accuracy. It should also be understood that the three BTSs used in the location estimation may be those shown in FIG. 2, i.e., BTSs 12, 12A and 12B, where the timing delay information for the temporarily idle BTS 12 is calculated just prior to or after the idle period. Alternatively, if, for some reason, all of the measurements have to be carried out simultaneously, three neighboring BTSs, e.g., BTSs 12A, 12B and 12C, may instead be used to calculate the position of the MS 10 during the quiescent period of the BTS 12.

There are various mechanisms by which the BTS 12 may introduce the aforementioned idle period within the downlink CDMA wideband transmission signal. First, the pertinent BTS may steal the requisite idle period of a given time interval of duration from normal transmission, and rely on conventional masking techniques to correct the information gap. Second, as with the exploitation of TDMA protocols, the air interface standard of the CDMA or other like protocol may be exploited to provide the requisite idle time periods.

Since the simultaneous powering down of two or more neighboring BTSs, e.g., BTS 12 and 12A, could render the measurements done during the idle period worthless, the idle periods should be generated in a given BTS pursuant to a random or pseudo-random technique to avoid periodic simultaneous BTS shutdowns. It should, of course, be understood that a requisite pseudo-random repetition of the idle periods at a given BTS may be determined by a unique BTS value associated with each BTS.

In an alternate embodiment of the present invention, the aforementioned idle periods are distributed in a non-random, periodical manner, presenting an easier air interface design decision. As discussed, the advantage of employing random idle periods is that a given MS would less likely encounter simultaneous idle periods of the BTSs used in location measurements. This periodicity may, nevertheless, be achieved using periodical idle periods if an MS about its BTS, e.g., MS 10, reports each such instance of simultaneous (or nearly simultaneous) conflicting idle periods to the serving BTS, i.e., BTS 12. Upon detection of the (near) simultaneous signals, the BTS 12 may then transmit a time signal 22 to the pertinent BTS involved, e.g., BTS 12A, for adjusting the periodicity of the idle periods for the pertinent BTS to no longer coincide with that of BTS 12. Alternatively, the BTS 12 may adjust its own idle period timing to avoid conflict with the other BTS 12A. It should be understood that this timing or periodicity adjustment could also constitute a relocation of the idle period within the CDMA frame structure or a time shift of the entire frame structure, as is understood in the art.

Since the MS 10 must ascertain that an idle period has occurred to perform the aforedescribed pilot signal measurements, the BTS 12 may pretransmit an idle period signal to herald an imminent idle period. Alternatively, the MS 10 can use the aforementioned unique BTS value to calculate the time of occurrence of the idle period for a respective BTS. Further, the MS 10 can identify the occurrence of an idle period and thereafter determine the pseudo-random occurrence of subsequent idle periods according to a given periodicity or pattern pursuant to an algorithm for such occurrences. It should be understood, however, that the MS 10, after performing the aforementioned distance measurements, e.g., time delay estimation or power measurements, serves up the measured distance values from the neighboring BTSs, upon resumption of communications with the BTS 12, to the BTS 12, which includes a memory and procedure for storing and performing the actual positioning calculations.

It should be understood that all downlink transmissions to the MSs need not be turned off in the BTS 12, as they are in the first embodiment of the present invention. Instead, in a second embodiment of the present invention, all transmissions from the BTS 12 are ceased during the aforementioned idle period except the pilot signal from the BTS 12. As is understood in the art, particularly under the IS-95 standard, the aforementioned pilot signal is used by the MS 10 to find a BTS. The synchronization or sync channel is then employed by the MS 10 to ascertain which BTS was found.

One mechanism the MS 10 may employ to determine the identity of a found BTS is to have the MS 10 transmit the found PN-sequence offset for that BTS, each BTS having its own PN-sequence offset, the pilot channel alone identifying the BTS (after the pertinent information is served up to the BTS 12 which makes this determination) It should be understood, however, that although the present embodiments are directed towards the current IS-95 CDMA standard, future CDMA standards may employ additional and other broadcast channels that could be used to identify the found BTS. Accordingly, the scope of the present invention should not be limited to usage with the current standard alone. It should also be understood that in this second embodiment of the present invention the idle periods need not be generated pseudo-randomly if the MS 10 uses pilot signals for measuring.

In the uplink scenario, i.e., transmission from the MS 10 to the BTS 12, the aforedescribed idle period of transmissions by the BTS 12 may be used by the BTS 12 to perform time delay or other measurements on distant MSs, e.g., one of MSs 20A, 20B and 20C in communication with the adjacent BTS 12A. In this third embodiment of the present invention, the position estimation of the distant MS 20A by BTS 12 is performed by silencing all or at least most of the mobile stations, e.g., MSs 10, 10A, 10B and 10C about BTS 12 and focusing the trilateration or other techniques on the distant MS 20A using the BTSs 12, 12A and 12B, for example, and any other neighboring BTSs. As discussed, MS 20A, operating on the same frequencies as the MSs 10 and 10A–10C, is also in communication with BTS 12 (and other nearby BTSs) via a signal 24, which may reach the BTS 12 and other trilateration BTSs, such as BTS 12B, when the local traffic has been quieted, i.e., during an idle period.

In other words, MSs 10, 10A and 10B are silent only during the time of the measurements performed by their local BTS 12 on the remote MS 20A. When, however, BTS 12A is measuring the "remote" MS 10, then only those MSs close to BTS 12A, i.e., local MSs 20A–C, should be silent. Of course the numbers and duration of such transmission cessations should be kept to a minimum to avoid interference with normal transmission traffic.

Conversely and with further reference to FIG. 1, position estimation of the MS 10 may be performed using BTS 12A after silencing the MSs 20A–20C in communication therewith, as described in connection with the techniques shown in FIG. 2.

It should, therefore, be understood that the governing BTS, e.g., BTS 12, must forward time alignment commands to the MSs 10 and 10A–10C within its control in order to synchronize the idle periods between them. One mechanism to accomplish this alignment is to align the CDMA frames of the MSs 10 and 10A–10C, as described hereinbefore.

Since the MSs 10A–10C are subjected to signals from not only the adjacent BTS 12 but all other, neighboring BTSs, such as BTSs 12A–12D, one strategy for time alignment is to allow the respective MSs to act on the commands from the strongest BTS in range. This strategy ensures that a majority of the MSs close to a given BTS will be aligned thereto.

With reference again to the downlink scenario of the first and second embodiments of the present invention, it should be apparent that the BTS 12, during its own idle period, can measure properties from the other BTSs, e.g., BTSs 12A–12D, such as time delays for the position estimation. This idle period measurement by the turned-off BTS is useful in situations where the MS performs some of the time delay measurements since typical positioning solutions require knowledge about the absolute times used by other BTSs. Conventional systems generally transport this information through a network backbone, such as across the PSTN 14 or across a dedicated line. By allowing the BTS, e.g., BTS 12, to do the requisite time measurements on its neighboring BTSs, e.g., BTS 12A and 12B, involved during its own idle period, the MS' position can be readily determined without transporting the absolute time of the neighboring BTSs through the network.

Additionally, by adapting existing systems, particularly signals such as pilot signals, to accomplish the FCC mobile positioning mandate, the present invention avoids the use of dedicated range transceivers and other such additional equipment for such positioning, such as described in U.S. Pat. No. 5,600,706 to Dunn, et al. Such elaborate add-on equipment unnecessarily consumes system resources and operates quite differently from the system and method of the present invention, set forth hereinabove and claimed hereinafter.

It should be understood that the aforementioned idle periods may be introduced not only into existing CDMA standards but may be incorporated into future CDMA standards, which would enable the introduction of idle periods without data loss.

Although the presently preferred embodiment of the present invention utilizes the time intervals of transmission cessation for location positioning of mobile stations, it should be understood that the scope of the invention more broadly encompasses the use of such transmission cessations, inserted by the local base transceiver system and otherwise, for other purposes as well.

The previous description is of preferred embodiments for implementing the invention, and the scope of the invention should not necessarily be limited by this description. The scope of the present invention is instead defined by the following claims.

What is claimed is:

1. A radiocommunication system for determining a location position of a mobile station therein, said radiocommunication system comprising:

a local base transceiver system in communication with said mobile station, said local base transceiver system ceasing transmissions for a given time interval;

distance detection means for detecting and measuring, during said given time interval, a multiplicity of distance measurements to a corresponding multiplicity of remote base transceiver systems;

calculation means for calculating said location position of said mobile station within said radiocommunication system using said remote base transceiver system distance measurements; and conflict detection means for detecting a time interval conflict between said local base transceiver system and at least one of said remote base transceiver systems, wherein said given time interval of transmission cessation of said local base transceiver system substantially overlaps another time interval of transmission cessation of said at least one remote base transceiver system, wherein upon detecting said time interval conflict said local base transceiver system transmits a time interval adjustment signal.

2. The system according to claim 1, wherein said calculation means uses at least two remote base transceiver system distance measurements.

3. The system according to claim 2, wherein said calculation means uses at least three remote base transceiver system distance measurements.

4. The system according to claim 1, wherein said distance detection means is within said mobile station, said distance detection means further detecting and measuring a local distance measurement for said local base transceiver system, and wherein said calculation means uses said local distance measurement in calculating the location position of said mobile station.

5. The system according to claim 1, wherein said conflict detection means is within said mobile station.

6. The system according to claim 1, further comprising:

conflict resolution means, wherein upon detection of said time interval conflict by said conflict detection means, said conflict resolution means transmits said time interval adjustment signal.

7. The system according to claim 6, wherein said conflict resolution means is attached to said local base transceiver system.

8. The system according to claim 1, wherein successive cessations of transmission by said local base receiver system are separated by random time intervals.

9. The system according to claim 8, wherein said random time intervals are determined by an identifier associated with said local base transceiver system.

10. The system according to claim 9, wherein said identifier is a PN-sequence offset.

11. The system according to claim 1, wherein successive cessations of transmission by said local base transceiver system are separated by periodic time intervals.

12. The system according to claim 11, wherein said periodic time intervals are determined by an identifier associated with said local base transceiver system.

13. The system according to claim 1, wherein said local base transceiver system transmits an idle period alert prior to ceasing said transmissions.

14. The system according to claim 1, wherein the communications between said local base station and said mobile station during said given time interval are masked.

15. The system according to claim 14, wherein a plurality of other communications between said local base transceiver station and a corresponding plurality of other mobile stations during said given time interval are masked.

16. The system according to claim 1, wherein said radiocommunication system is a code division multiple access system.

17. The system according to claim 1, wherein said distance detection means is within said mobile station, said mobile station forwarding said multiplicity of distance measurements to said local base transceiver system.

18. The system according to claim 1, wherein said distance detection means is within said local base transceiver system.

19. The system according to claim 18, wherein said distance detection means within said local base transceiver system, during said given time interval, detects and measures a mobile distance measurement to a remote mobile station, said remote mobile station being in communication with said local base transceiver system and at least one of said remote base transceiver systems.

20. The system according to claim 18, wherein said distance detection means within said local base transceiver system, during said given time interval, detects and measures respective mobile distance measurements to said mobile station from a respective plurality of said remote base transceiver systems.

21. The system according to claim to claim 1, wherein said calculation means is attached to said local base transceiver system, said distance measurements being forwarded to said calculation means via said local base transceiver system.

22. The system according to claim 1, wherein said local base transceiver system is in communication with at least one other mobile station, said local base transceiver system comprising alignment means to coordinate said given time interval transmission cessation with said mobile stations.

23. The system according to claim 22, wherein said alignment means aligns respective CDMA frames for said mobile stations and said local base transceiver system.

24. The system according to claim 1, wherein said local base transceiver system ceases all transmissions during said given time interval but for a pilot signal.

25. The system according to claim 1, wherein said distance detection means is within said mobile station, said mobile station, during said given time interval, detecting and measuring respective mobile distance measurements thereto from a respective plurality of said remote base transceiver systems.

26. A method for determining a location position of a mobile station communicating with a local base transceiver system within a radiocommunication system, said method comprising the steps of:

ceasing transmissions by said local base transceiver system for a given time interval;

detecting, during said given time interval, a multiplicity of distance measurements to a corresponding multiplicity of remote base transceiver systems;

forwarding said multiplicity of distance measurements of said remote base transceiver systems to a calculator means;

calculating, within said calculation means, said location position of said mobile station within said radiocommunication system using said remote base transceiver system distance measurements;

detecting a time interval conflict between said local base transceiver system and at least one of said remote base transceiver systems, wherein said given time interval of transmission cessation of said local base transceiver system substantially overlaps another time interval of transmission cessation of said at least one remote base transceiver system; and upon detecting said interval conflict, transmitting a time interval adjustment signal.

27. The method according to claim 26, wherein at least two said remote base transceiver systems are used for said distance measurements.

28. The method according to claim 27, wherein at least three said remote base transceiver systems are used for said distance measurements.

29. The method according to claim 26, further comprising the step of:

detecting, by said mobile station, a local distance measurement for said local base transceiver system, said local distance measurement being one of said multiplicity of distance measurements used in said step of calculating the location position of said mobile station.

30. The method according to claim 26, wherein successive cessations of transmission by said local base receiver system are separated by random time intervals.

31. The method according to claim 26, wherein successive cessations of transmission by said local base transceiver system are separated by periodic time intervals.

32. The method according to claim 26, further comprising the step of:

transmitting, by said local base transceiver system prior to said transmission cessation, an idle period alert signal.

33. The method according to claim 26, further comprising the step of:

masking, during said transmission cessation, the communications between said local base station and said mobile station.

34. The method according to claim 33, wherein said step of masking further comprises masking a plurality of other communications between said local base transceiver system and a corresponding plurality of other mobile stations.

35. The method according to claim 26, wherein said radiocommunication system is a code division multiple access system.

36. The method according to claim 26, wherein said mobile station, in said step of detecting, detects said given time interval, said mobile station forwarding said multiplicity of distance measurements to said local base transceiver system.

37. The method according to claim 26, wherein said local base transceiver system, in said step of detecting, detects said given time interval.

38. The method according to claim 37, wherein said step of detecting further comprises detecting a mobile distance measurement to a remote mobile station being in communication with said local base transceiver system and at least one of said remote base transceiver systems.

39. The method according to claim 26, wherein in said step of calculation, said calculation means is attached to said local base transceiver system, said distance measurements being forwarded to said calculation means via said local base transceiver system.

40. The method according to claim 26, further comprising the step of:
aligning, by said local base transceiver system, said mobile station and at least one other mobile station with said given time interval.

41. The method according to claim 40, wherein said step of aligning aligns respective CDMA frames for said mobile stations and said local base transceiver system.

42. The method according to claim 26, wherein said local base transceiver system ceases all transmissions during said given time interval but for a pilot signal.

43. A radiocommunication system having a plurality of mobile stations, comprising:
a local base transceiver system in communication with said mobile stations;
transmission cessation means, within said local base transceiver system, for ceasing the communications from said local base transceiver system to said mobile stations for a given time interval; and
conflict detection means for detecting a time interval conflict, between said local base transceiver system and at least one remote base transceiver system, wherein when said given time interval of transmission cessation of said local base transceiver system substantially overlaps another time interval of transmission cessation of said at least one remote base transceiver system, upon detecting said time interval conflict said local base transceiver system transmits a time interval adjustment signal.

44. The system according to claim 43, further comprising:
distance detection means for detecting and measuring, during said given time interval, a multiplicity of distance measurements to a corresponding multiplicity of remote base transceiver systems; and
calculation means for calculating a location position of said mobile station within said radiocommunications system using said remote base transceiver system distance measurements.

45. The system according to claim 43, wherein successive cessations of transmission by said local base transceiver system are separated by random time intervals.

46. The system according to claim 43, wherein successive cessations of transmission by said local base transceiver system are separated by periodic time intervals.

47. The system according to claim 43, wherein said local base transceiver system transmits an idle period alert prior to ceasing said transmission.

48. The system according to claim 43, wherein said radiocommunication system is a code division multiple access system.

49. The system according to claim 43, wherein said local base transceiver system is in communication with at least two mobile stations, said local base transceiver system comprising alignment means to coordinate said given time interval transmission cessation with said at least two mobile stations.

50. The system according to claim 49, wherein said alignment means aligns respective CDMA frames for said mobile stations and said local base transceiver system.

51. The system according to claim 43, wherein said local base transceiver system ceases all transmissions during said given time interval but for a pilot signal.

52. The method according to claim 43, wherein said local base transceiver system ceases all transmissions during said given time interval but for a pilot signal.

53. A method for ceasing transmissions from a local base transceiver system to a plurality of mobile stations in a radiocommunication system, said method comprising the steps of:
determining, within said local base transceiver system, a given time interval in which to cease said transmissions to said mobile stations;
ceasing said transmissions during said given time interval, at least one of said mobile stations during said time interval communicating with at least one remote base station transceiver system;
detecting a time interval conflict between said local base transceiver system and at least one of said remote base transceiver systems, wherein said given time interval of transmission cessation of said local base transceiver system substantially overlaps another time interval of transmission cessation of said at least one remote base transceiver system; and
upon detecting said interval conflict, transmitting a time interval adjustment signal.

54. The method according to claim 53, wherein said communicating by said mobile stations with said at least one remote base transceiver system further comprises the steps of:
detecting, during said given time interval, a multiplicity of distance measurements to a corresponding multiplicity of remote base transceiver systems;
forwarding said multiplicity of distance measurements of said remote base transceiver systems to a calculator means; and
calculating, within said calculation means, a location position of said mobile station within said radiocommunication system using said remote base transceiver system distance measurements.

55. The method according to claim 53, wherein successive cessations of transmission by said local base receiver system are separated by random time intervals.

56. The method according to claim 53, wherein successive cessations of transmission by said local base transceiver system are separated by periodic time intervals.

57. The method according to claim 53, further comprising the step of:
transmitting, by said local base transceiver system prior to said transmission cessation, an idle period alert signal.

58. The method according to claim 53, further comprising the step of:
masking, during said transmission cessation, the communications between said local base station and said mobile stations.

59. The method according to claim 53, wherein said radiocommunication system is a code division multiple access system.

60. The method according to claim 53, further comprising the step of:
aligning, by said local base transceiver system, a multiplicity of mobile stations with said given time interval.

61. The method according to claim 60, wherein said aligning aligns respective CDMA frames for said mobile stations and said local base transceiver system.

62. The method according to claim 53, wherein said local base transceiver system ceases all transmissions during said given time interval but for a pilot signal.

* * * * *